Figure 1:
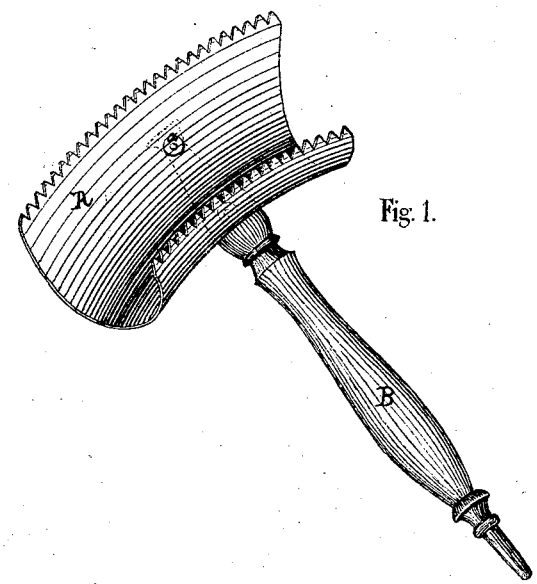

T. J. HUTCHINS.
Curry-Combs.

No. 152,290.    Patented June 23, 1874.

WITNESSES:
Sydney Brooks.

INVENTOR.
Thomas J. Hutchins.
Per Z. D. Dederick.
Attorney.

UNITED STATES PATENT OFFICE.

THOMAS J. HUTCHINS, OF CAYUGA, MISSISSIPPI.

IMPROVEMENT IN CURRY-COMBS.

Specification forming part of Letters Patent No. 152,290, dated June 23, 1874; application filed January 21, 1874.

*To all whom it may concern:*

Be it known that I, THOMAS J. HUTCHINS, of Cayuga, in the county of Hinds and State of Mississippi, have invented certain new and useful Improvements in Curry-Combs, of which the following is full, clear, and exact description, reference being had to the accompanying drawing and the letters of reference marked thereon, making part of this specification, in which—

Figure 1 is a perspective view of the complete device.

The nature of my invention consists in making the comb-plate of horn or gutta-percha, and of the form shown, the same to be rigidly secured to a handle so as to operate exactly as in the ordinary curry-comb.

The great improvement and advantage derived by the use of material of this description will readily suggest itself, especially when it is remembered that it is the comb-bars alone that are subject to wear, and as soon as they become smooth the entire device is valueless and is thrown aside; but with my device it is different. You have simply to take a three-cornered file and sharpen the teeth as you would a saw, when you have to all intents and purposes a new curry-comb.

The construction and operation of my invention is as follows: A is the comb-plate, constructed of horn or gutta-percha; but I prefer the former as most suitable. When horn is used it is cut into lengths of from four to six inches, and these pieces are again cut into halves lengthwise, forming a section of an annular cylinder, the edges of which are serrated or provided with teeth of suitable size and shape, after which it is secured to a handle, B, by rivets or screws *a*. When gutta-percha is employed the comb-plate is molded into a similar shape and provided with teeth of the same size as those constructed of horn.

From the foregoing description the operation will be readily understood.

The comb plate and handle, being constructed as stated, completes a device as perfect and in every way as strong and firm as is the ordinary curry-comb. So soon as the teeth are worn off, instead of throwing away the comb as no longer of any value, and as you are compelled to do with many curry-combs known to the trade, you simply take a common saw-file and sharpen the teeth, when in reality you have a comb as good as when it was first purchased.

Having thus described my invention, what I claim as new, and desire to secure by Letters Patent, is—

A curry-comb consisting of a section of an annular cylinder, so bent as to present concentric series of teeth at the edges thereof, and attached to a handle, as described.

THOMAS J. HUTCHINS.

Witnesses:
SIDNEY BROOKS,
Z. P. DEDRICK.